(12) United States Patent
Kuroyanagi et al.

(10) Patent No.: US 10,612,457 B2
(45) Date of Patent: Apr. 7, 2020

(54) INTERCOOLER

(71) Applicant: DENSO CORPORATION, Kariya, Aichi-pref. (JP)

(72) Inventors: Isao Kuroyanagi, Kariya (JP); Masaki Harada, Kariya (JP); Takefumi Kawaguchi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/076,713

(22) PCT Filed: Dec. 19, 2016

(86) PCT No.: PCT/JP2016/087725
§ 371 (c)(1),
(2) Date: Aug. 9, 2018

(87) PCT Pub. No.: WO2017/138259
PCT Pub. Date: Aug. 17, 2017

(65) Prior Publication Data
US 2019/0048785 A1    Feb. 14, 2019

(30) Foreign Application Priority Data

Feb. 11, 2016  (JP) .................................. 2016-024231

(51) Int. Cl.
*F02B 29/04*    (2006.01)
*F28D 9/00*     (2006.01)

(52) U.S. Cl.
CPC .......... *F02B 29/0443* (2013.01); *F02B 29/04* (2013.01); *F28D 9/0056* (2013.01); *F01P 2060/02* (2013.01); *Y02T 10/146* (2013.01)

(58) Field of Classification Search
CPC .. F02B 29/0431; F02B 29/04; F02B 29/0412; F02B 29/0425; F02B 29/0456;
(Continued)

(56) References Cited

U.S. PATENT DOCUMENTS 6,688,292 B2   2/2004 Ruppel et al.
7,104,062 B2   9/2006 Amaral
(Continued)

FOREIGN PATENT DOCUMENTS

DE   102006008826 A1   8/2007
JP   H06147785 A       5/1994
(Continued)

OTHER PUBLICATIONS

U.S. Appl. No. 16/076,714, filed Aug. 6, 2018, Kuroyanagi et al.
U.S. Appl. No. 16/076,714, filed Aug. 9, 2018, Kuroyanagi et al.

*Primary Examiner* — Mark A Laurenzi
*Assistant Examiner* — Mickey H France
(74) *Attorney, Agent, or Firm* — Harness, Dickey & Pierce, P.L.C.

(57) ABSTRACT

An intercooler includes flow path tubes and fins stacked with each other. Cooling medium includes first cooling medium and second cooling medium. A second cooling medium flow path of the flow path tubes is located upstream of a first cooling medium flow path with respect to supercharged intake air. The second cooling medium flow path includes a second U-turn portion. In the second cooling medium flow path, a downstream flow path located downstream of the second U-turn portion is located upstream, in a flow direction of the supercharged intake air, of an upstream flow path located upstream of the second U-turn portion. A heat exchange limiting portion is provided at a position between the flow path tubes and the fins, the position being adjacent to a most upstream part, in the flow direction of the supercharged intake air, of the downstream flow path.

5 Claims, 4 Drawing Sheets

(58) Field of Classification Search
CPC .............. F02B 29/0493; F02B 29/0443; F02B 29/0462; F01P 7/10; F01P 5/06; F01P 2060/02; F01P 2070/50; F01P 11/10; F01P 3/18; F01P 3/182; F01P 3/185; F01P 3/187; B23K 1/0012; F28F 2275/04; F28F 13/14; F28D 9/0056; F28D 9/0093; F28D 9/0043; F28D 9/005; F28D 9/0068
USPC ...... 123/563, 41.48, 41.49, 41.56, 540, 542; 165/140, 166, 167, 41, 42, 44
See application file for complete search history.

(56) References Cited

U.S. PATENT DOCUMENTS

| | | | |
|---|---|---|---|
| 8,191,365 B2 | 6/2012 | Quinn et al. | |
| 2006/0196052 A1* | 9/2006 | Lesage | B21D 53/085 |
| | | | 29/890.043 |
| 2007/0000457 A1 | 1/2007 | Guerrero et al. | |
| 2010/0155014 A1 | 6/2010 | Guerrero et al. | |
| 2013/0276763 A1 | 10/2013 | Eilemann et al. | |
| 2016/0326949 A1 | 11/2016 | Harada et al. | |
| 2016/0356205 A1* | 12/2016 | Braun | F02B 29/0443 |
| 2017/0082381 A1 | 3/2017 | Sugimura et al. | |

FOREIGN PATENT DOCUMENTS

| | | | |
|---|---|---|---|
| JP | 2015004332 A | 1/2015 | |
| JP | 2015145667 A | 8/2015 | |
| JP | 2015155692 A | 8/2015 | |
| JP | 2015183908 A | 10/2015 | |
| JP | 2016023556 A | 2/2016 | |
| WO | WO-2004044401 A1 | 5/2004 | |
| WO | WO-2004085810 A2 | 10/2004 | |
| WO | WO-2011148785 A1 * | 12/2011 | ......... F28D 1/05333 |
| WO | WO-2012080508 A1 | 6/2012 | |

* cited by examiner

INTERCOOLER

CROSS REFERENCE TO RELATED APPLICATIONS

This application is a U.S. National Phase Application under 35 U.S.C. 371 of International Application No. PCT/JP2016/087725 filed on Dec. 19, 2016 and published in Japanese as WO/2017/138259 A1 on Aug. 17, 2017. This application is based on and claims the benefit of priority from Japanese Patent Application No. 2016-024231 filed on Feb. 11, 2016. The entire disclosures of all of the above applications are incorporated herein by reference.

TECHNICAL FIELD

The present disclosure relates to an intercooler for cooling intake air supercharged by a supercharger.

BACKGROUND ART

An intercooler that cools supercharged intake air is known, which performs heat exchange between the supercharged air supplied to an engine by a supercharger and two types of cooling water having temperatures different from each other (see, for example, Patent Literature 1). In the intercooler disclosed in Patent Document 1, the hot cooling water makes a U-turn on the upstream side in the flow direction of the supercharged intake air, and the cold cooling water makes a U-turn on the downstream side in the flow direction of the supercharged intake air. In the hot cooling water flow path and the cold cooling water flow path, inner fins for promoting heat exchange between the cooling water and the supercharged intake air are provided.

According to the configuration as above, the cold cooling water can be warmed quickly with heat of the hot cooling water at engine start-up. Further, because the supercharged intake air can be pre-cooled with the hot cooling water before the supercharged intake air is cooled with the cold cooling water, cooling performance of a supercharged intake air cooling system can be improved.

PRIOR ART DOCUMENT

Patent Document

Patent Document 1: JP 2015-155692 A

SUMMARY OF THE INVENTION

In the intercooler described in Patent Document 1, the hot cooling water flow path has a U-turn structure in which a downstream flow path is located upstream of an upstream flow path with respect to the flow of the supercharged intake air. Therefore, in the downstream flow path of the hot cooling water flow path, the cooling water exchanges heat with hot supercharged intake air, and accordingly the temperature of the cooling water is likely to increase. Since the hot cooling water flow path has the U-turn structure, a narrow flow path, and inner fins, a pressure loss of the cooling water may be large, and the boiling point of the cooling water may decrease.

As a result, the cooling water may boil in the downstream flow path in the hot cooling water path. If the cooling water boils in the hot cooling water flow path, it may cause a temperature increase of components around the hot cooling water flow path, and accordingly a strength of the components may decrease and the components may be damaged.

In view of the above, it is an object of the present disclosure to suppress a boiling of cooling medium in an intercooler which is configured to cool a supercharged intake air with two kinds of cooling medium having different temperature.

According to one aspect of the present disclosure, an intercooler cools supercharged intake air by exchanging heat between supercharged cooling medium and the supercharged intake air supercharged to an engine by a supercharger. The intercooler includes a heating portion in which flow path tubes and fins are stacked with each other, and the heating portion is configured to exchange heat between the cooling medium flowing inside the flow path tubes and the supercharged intake air flowing outside the flow path tubes. The cooling medium includes first cooling medium and second cooling medium whose temperature is higher than a temperature of the first cooling medium. The flow path tubes define therein: a first cooling medium flow path through which the first cooling medium flows in a direction intersecting a flow direction of the supercharged intake air; and a second cooling medium flow path through which the second cooling medium flows in a direction intersecting the flow direction of the supercharged intake air. The second cooling medium flow path is located upstream of the first cooling medium flow path with respect to the flow direction of the supercharged intake air. The first cooling medium flow path includes a first U-turn portion in which the first cooling medium makes a U-turn, and the second cooling medium flow path includes a second U-turn portion in which the second cooling medium makes a U-turn. In the second cooling medium flow path, a downstream flow path located downstream of the second U-turn portion is located upstream, in the flow direction of the supercharged intake air, of an upstream flow path located upstream of the second U-turn portion. A heat exchange limiting portion, which is configured to limit a heat exchange between the flow path tubes and fins, is provided at least at a position between the flow path tubes and the fins, the position being adjacent to a most upstream part, in the flow direction of the supercharged intake air, of the downstream flow path.

According to this, in the most upstream part in the flow direction of the supercharged intake air, the heat of the supercharged intake air is prevented from transmitted to the second cooling water in the outlet side passage through the fins. As a result, it is possible to suppress boiling of the second cooling water in the outlet side passage where the second cooling water may easily boil. Accordingly, temperature increase of components around the second outlet side flow path can be suppressed, and reduction in strength and breakage can be avoided.

EMBODIMENTS FOR EXPLOITATION OF THE INVENTION

Hereinafter, embodiments for implementing the present disclosure will be described referring to drawings. In each embodiment, portions corresponding to the elements described in the preceding embodiments are denoted by the same reference numerals, and redundant explanation may be omitted. In each of the embodiments, when only a part of the configuration is described, the other parts of the configuration can be applied to the other embodiments described above. The present disclosure is not limited to combinations of embodiments which combine parts that are explicitly described as being combinable. As long as no problems are present, the various embodiments may be partially combined with each other even if not explicitly described.

First Embodiment

A first embodiment of the present disclosure will be described with reference to the drawings. In the first embodiment, an example in which an intercooler of the present disclosure is applied to a supercharged intake air cooling system for a vehicle will be described.

Figure 1:
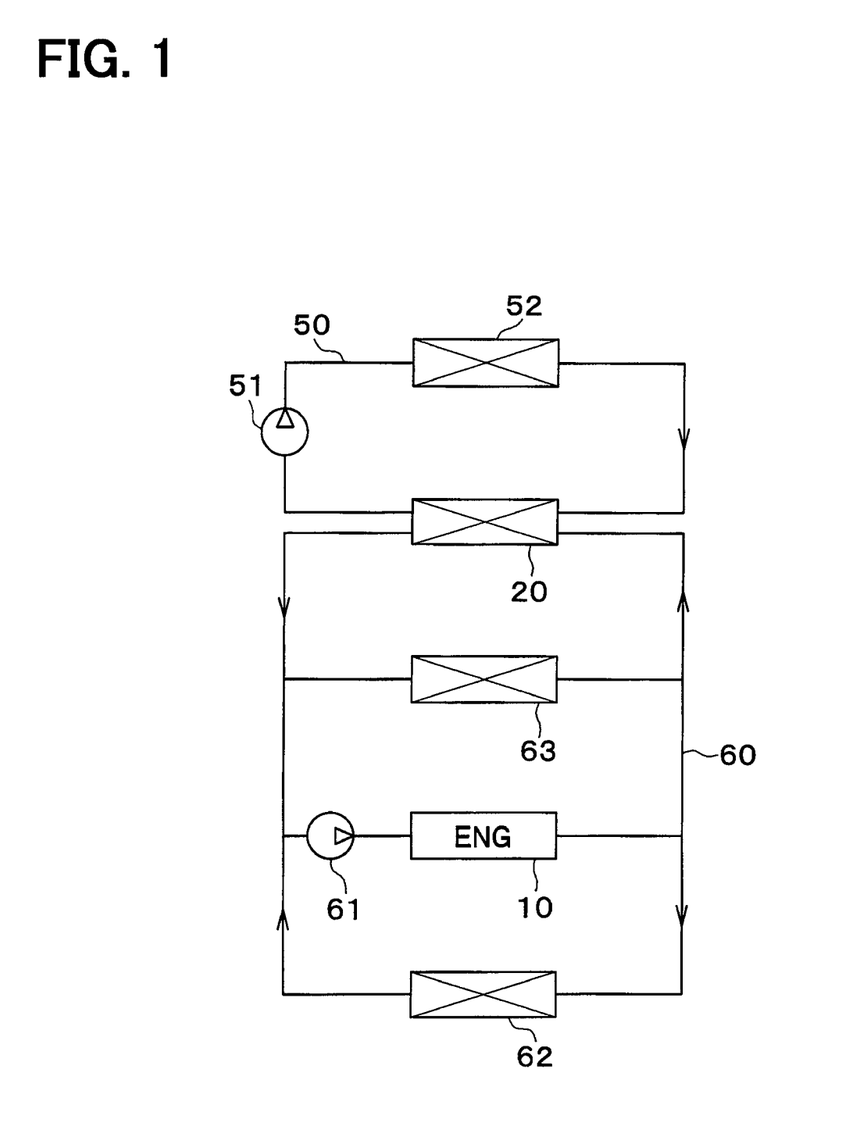
FIG. 1 is a diagram illustrating an overview of a supercharged intake air cooling system for a vehicle according to a first embodiment of the present disclosure.

A supercharger (not shown) for supercharging intake air to an engine 10 is provided in an intake air system of the engine 10 of the vehicle (that is, an internal combustion engine). This supercharger is provided to compensate for the maximum output of the engine 10. That is, the vehicle of the present embodiment has the engine 10 made smaller for higher fuel efficiency and the supercharger is used to compensate for the maximum output reduced in exchange for making the engine 10 smaller.

An intercooler 20 cooling engine intake air is located downstream of the supercharger in the intake air system with respect to a flow of the intake air. The intercooler 20 cools the supercharged intake air that has been compressed by the supercharger so as to improve a charging efficiency of the engine intake air.

First cooling water circulating in a first cooling water circuit 50 and second cooling water circulating in a second cooling water circuit 60 flows through the intercooler 20. The intercooler 20 cools the supercharged intake air by exchanging heat between first, second cooling water and the supercharged intake air compressed by the supercharger.

A water pump 51 that causes the first cooling water to circulate is provided in the first cooling water circuit 50. A first radiator 52 that cools the first cooling water by radiating heat of the first cooling water is provided between the water pump 51 and the intercooler 20 in the first cooling water circuit 50.

A water pump 61, a second radiator 62, and a heater core 63 are provided in the second cooling water circuit 60. The water pump 61 circulates the second cooling water in the second cooling water circuit 60. The second radiator 62 releases heat, to an outside air, of the second cooling water absorbed from the engine 10. The heater core 63 heats blown air by exchanging the second cooling water and the blown air blown toward a vehicle compartment. The intercooler 20, the second radiator 62 and the heater core 63 are arranged in the second cooling water circuit 60 in parallel with each other.

The second cooling water absorbs heat from the engine 10. Therefore, when the first, second cooling water pass through an inside of the intercooler 20, the second cooling water is higher in temperature than the first cooling water. That is, the first cooling water is cold cooling water, and the second cooling water is hot cooling water. The first cooling water of the present embodiment corresponds to first cooling medium of the present disclosure, and the second cooling water of the present embodiment corresponds to second cooling medium of the present disclosure. LLC (antifreeze mixture), water or the like may be used as the first, second cooling water.

A driving force of the water pumps 51, 61 are transmitted from the engine 10 in the present embodiment, but an electric water pump may be used as the water pumps 51, 61.

Figure 2:
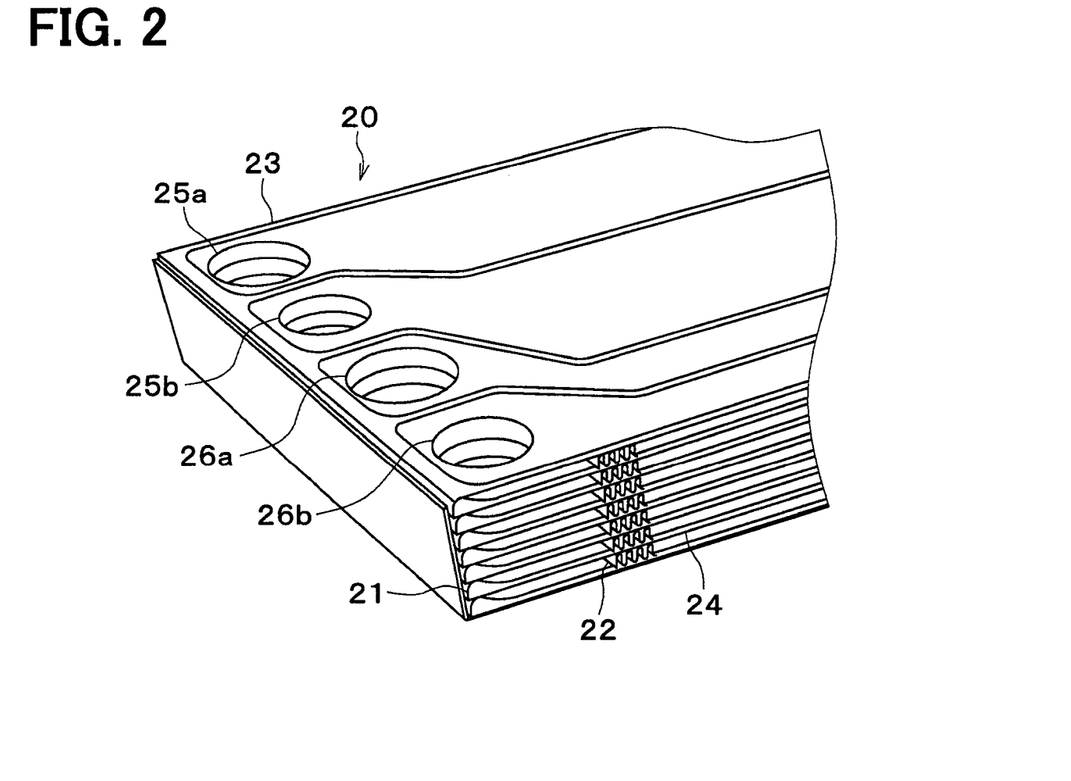
FIG. 2 is a perspective view a main part of an intercooler according to the first embodiment.

Subsequently, the intercooler 20 of the first embodiment will be described in detail. The intercooler 20 of the present embodiment is configured as a so-called drawn cup type heat exchanger. As shown in FIG. 2, the intercooler 20 includes a heat exchanging portion 23 in which multiple flow path tubes 21 and fins 22 bonded to adjacent flow path tubes 21 are alternately stacked with each other. Outer peripheries of a pair of plate members 24 are joined to each other to form the flow path tubes 21. The heat exchanging portion 23 exchanges heat between the first, second cooling water flowing inside the flow path tubes 21 and the supercharged intake air flowing outside the flow path tubes 21. The space in which the fins 22 are arranged between the flow path tubes 21 stacked with each other constitutes a supercharged intake air flow path through which supercharged intake air flows.

All or some of the constituent parts of the intercooler 20 are formed of a clad material formed by cladding a brazing material on the surface of a core material made of, for example, aluminum. The respective components of the intercooler 20 are brazed and bonded with each other by heating it in a condition where the flux is applied to the surface of the clad material.

Figure 3:
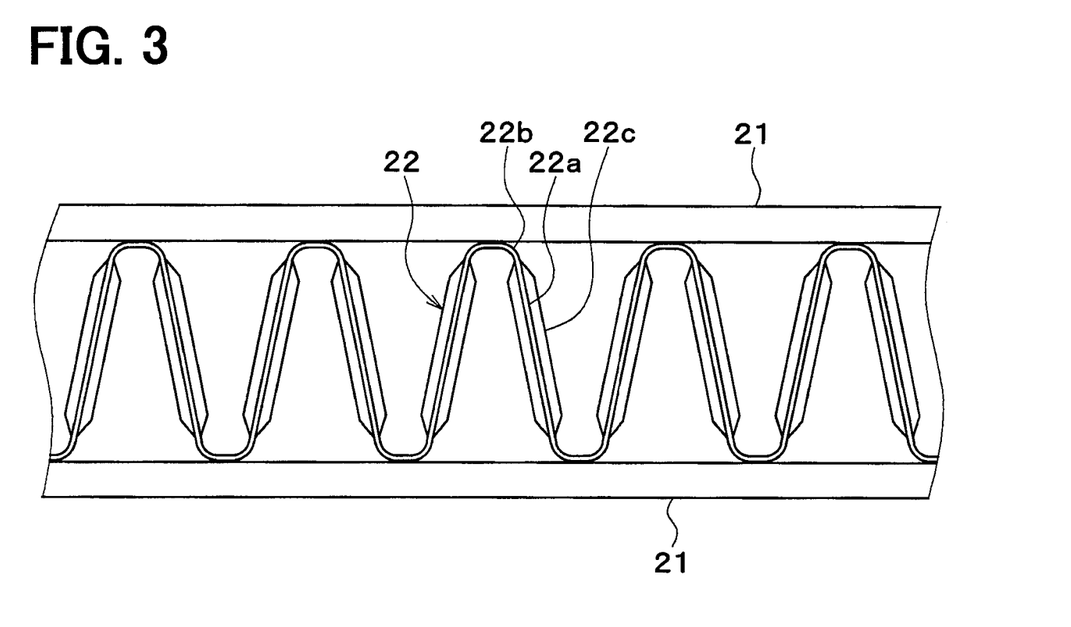
FIG. 3 is a front view illustrating flow path tubes and fins according to the first embodiment.

As shown in FIG. 3, the fin 22 of the present embodiment is a corrugated fin formed by bending a plate member into a corrugated shape. The fin 22 has a corrugated shape in which wall portions 22a constituting flat portions and peak portions 22b constituting bent portions are continuous. The fin 22 has a corrugated shape in which the peak portions 22b are alternately located on one side and the other side in a direction intersecting the direction of the flow of the supercharged intake air. The supercharged intake air flow path which is a space between the flow path tubes 21 stacked with each other is partitioned into multiple flow paths by the wall portion 22a. The fin 22 constitutes a heat exchange enhancing portion to increase a heat transmission area of the supercharged intake air and the first, second cooling water.

The fins 22 are configured as louver fins having louvers 22c formed on the wall portions 22a. The peak portions 22b of the fin 22 are brazed and bonded to the flat outer surface of the adjacent flow path tubes 21. The fin 22 can be formed, for example, by applying a roller molding method to a thin sheet metal material.

Figure 4:
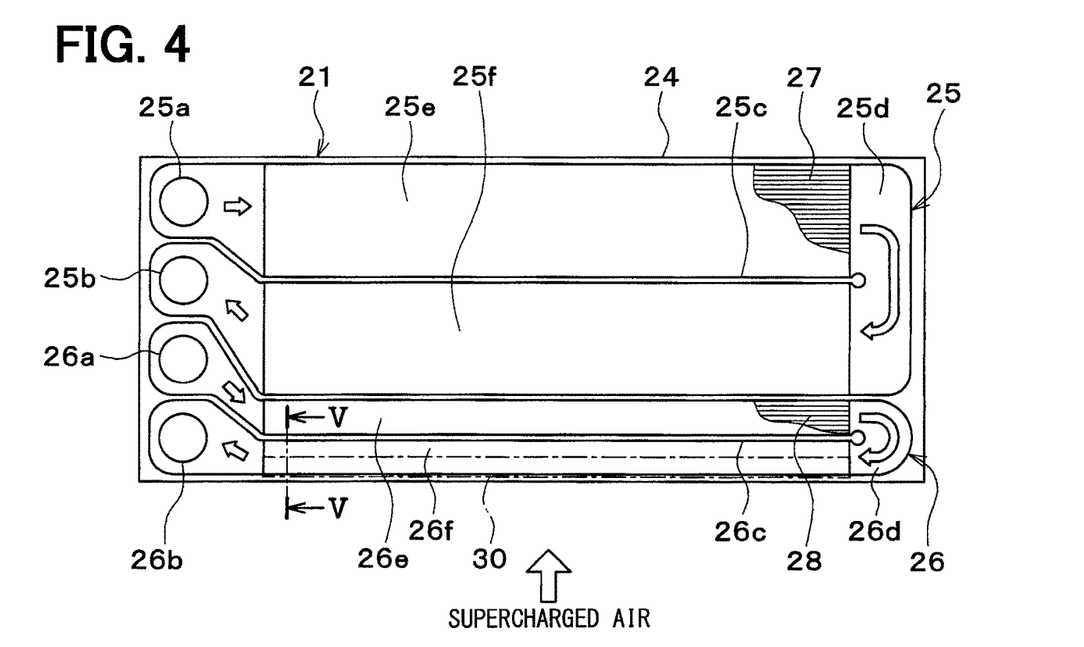
FIG. 4 is a schematic view illustrating an inside of the flow path tube according to the first embodiment.

As shown in FIG. 4, the flow path tubes 21 define therein a first cooling water flow path 25 through which the first cooling water flows and a second cooling water flow path 26 through which the second cooling water flows. In the flow path tube 21, the first cooling water flow path 25 and the second cooling water flow path 26 are arranged in parallel with each other in the flow direction of supercharged intake air. The flow direction of the cooling water in the cooling water flow paths 25, 26 is a direction intersecting the flow direction of supercharged intake air, more specifically, a direction orthogonal to the flow direction of supercharged intake air.

In the present embodiment, the first cooling water flow path 25 is located on a downstream side in the flow direction of the supercharged intake air, and the second cooling water flow path 26 is located on an upstream side in the flow direction of the supercharged intake air. That is, in the intercooler 20 of the present embodiment, the hot second cooling water flows on the upstream side of the supercharged intake air flow path through which the supercharged intake air flows, and the cold first cooling water flows on the downstream side of the supercharged intake air flow path.

The flow path lengths of the first cooling water flow path 25 and the second cooling water flow path 26 are the same. The lengths of these cooling water flow paths 25, 26 in the flow direction of the supercharged intake air, i.e. the lengths in the width direction of the cooling water flow paths 25, 26, are set so that the first cooling water flow path 25 is longer than the second cooling water flow path 26.

Although not shown, the intercooler 20 includes a first distribution tank portion that distributes the first cooling water to the first cooling water flow paths 25 of the flow path tubes 21, and a first collecting tank portion for collecting the first cooling water from the first cooling water flow paths 25. Although not shown, the intercooler 20 includes a second distribution tank portion that distributes the second cooling water to the second cooling water flow paths 26 of the flow path tubes 21, and a second collecting tank portion for collecting the second cooling water from the second cooling water flow paths 26.

The flow path tube 21 includes a first inlet portion 25a through which the first cooling water flows into the first cooling water flow path 25, and a first outlet portion 25b through which the first cooling water flows out of the first cooling water flow path 25. The flow path tube 21 includes a second inlet portion 26a through which the second cooling water flows into the second cooling water flow path 26, and a second outlet portion 26b through which the second cooling water flows out of the second cooling water flow path 26. The first inlet portion 25a, the first outlet portion 25b, the second inlet portion 26a, and the second outlet portion 26b are provided as through-holes in the flow path tube 21.

The first cooling water flow path 25 includes a first partition portion 25c that partitions the flow path into two flow paths, and a first U-turn portion 25d in which the first cooling water makes a U-turn. The first cooling water flow path 25 is partitioned by the first partition portion 25c into a first upstream flow path 25e close to the first inlet portion 25a and a first downstream flow path 25f close to the first outlet portion 25b. The first upstream flow path 25e is located upstream of the first U-turn portion 25d, and the first downstream flow path 25f is located downstream of the first U-turn portion 25d.

The second cooling water flow path 26 includes a second partition portion 26c that partitions the flow path into two flow paths, and a second U-turn portion 26d in which the second cooling water makes a U-turn. The second cooling water flow path 26 is partitioned by the second partition portion 26c into a second upstream flow path 26e close to the second inlet portion 26a and a second downstream flow path 26f close to the second outlet portion 26b. The second upstream flow path 26e is located upstream of the second U-turn portion 26d, and the second downstream flow path 26f is located downstream of the second U-turn portion 26d.

As described above, the second cooling water flow path 26 is located upstream of the first cooling water flow path 25 with respect to the flow direction of the supercharged intake air. Accordingly, the second downstream flow path 26f, the second upstream flow path 26e, the first downstream flow path 25f, and the first upstream flow path 25e are arranged in this order from the upstream side of the flow direction of the supercharged intake air. That is, in the flow paths 25e, 25f, 26e, 26f provided in the flow path tubes 21, the second downstream flow path 26f of the second cooling water flow path 26 is located on the most upstream part with respect to the flow direction of the supercharged intake air.

The temperature of supercharged intake air decreases from the upstream side to the downstream side in the flow direction of the supercharged intake air. Therefore, the temperature of the supercharged intake air is highest when passing through the most upstream portion in the flow direction of the supercharged intake air in the second downstream side flow path 26f.

In the present embodiment, the first inlet portion 25a, the first outlet portion 25b, the second inlet portion 26a, and the second outlet portion 26b are provided at one end portion in the longitudinal direction of the flow path tubes 21 (that is, on the left side end portion in FIG. 4). The second outlet portion 26b, the second inlet portion 26a, the first outlet portion 25b, and the first inlet portion 25a are arranged in this order from the upstream side in the flow direction of the supercharged intake air. The first U-turn portion 25d and the second U-turn portion 26d are located on the other end portion in the longitudinal direction of the flow path tubes 21 (that is, the right side end portion in FIG. 4).

In the first cooling water flow path 25, a first inner fin 27 that divides the first cooling water flow path 25 into multiple narrow flow paths is provided. The first inner fin 27 is disposed in each of the first upstream flow path 25e and the first downstream flow path 25f of the first cooling water flow path 25. In the second cooling water flow path 26, a second inner fin 28 that divides the second cooling water flow path 26 into multiple narrow flow paths is provided. The second inner fin 27 is disposed in each of the second upstream flow path 26e and the second downstream flow path 26f of the second cooling water flow path 26.

Since the second cooling water flow path 26 has the U-turn structure, a narrow flow path, and the second inner fin 28, a pressure loss of the second cooling water may be large, and the boiling point of the second cooling water may decrease. In addition, since the temperature of the supercharged intake air is high on the upstream side in the flow direction, and since the supercharged intake air directly contacts the most upstream portion of the flow path tube 21 in the flow direction of the supercharged intake air, the temperature of the second cooling water flowing through the second downstream flow path 26f is especially likely to increase.

Figure 5:
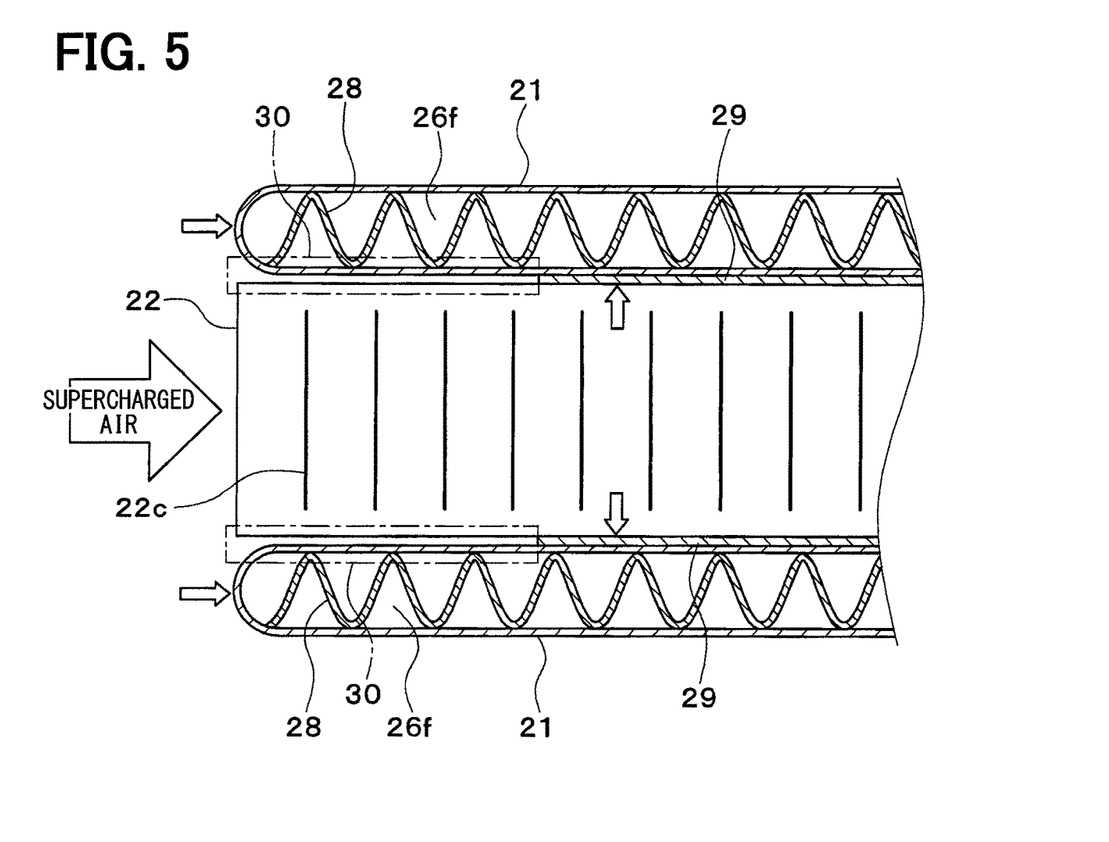
FIG. 5 is a cross-sectional view illustrating flow path tubes and fins according to the first embodiment.

As shown in FIG. 5, a bonded portion 29 provided by brazing is provided between the flow path tube 21 and the fin 22. The bonded portion 29 is made of a brazing material. In the present embodiment, between the flow path tube 21 and the fin 22, a non-bonded portion 30 in which the flow path tube 21 and the fin 22 are not brazed and bonded is provided. In the non-bonded portion 30, the flow path tube 21 and the fin 22 may be in contact with each other or may be out of contact with each other. The non-bonded portion 30 can be provided by not cladding a brazing material to a target portion, or by not applying flux to a target portion, for example.

In FIGS. 4 and 5, a portion encircled by a one-dotted broken line indicates the non-bonded portion 30. As shown in FIG. 4 and FIG. 5, in the flow direction of the supercharged intake air, the non-bonded portion 30 is located upstream of the bonded portion 29. That is, between the flow path tube 21 and the fin 22, the non-bonded portion 30 is provided on the upstream side in the flow direction of the supercharged intake air, and the bonded portion 29 is located downstream of the non-bonded portion 30.

Since the flow path tube 21 and the fin 22 are not brazed and bonded to each other in the non-bonded portion 30, the contact area between the flow path tube 21 and the fin 22 is smaller than in the bonded portion 29. Therefore, in the non-bonded portion 30, the heat transfer coefficient is lower than that of the bonded portion 29. That is, the non-bonded portion 30 constitutes a heat exchange limiting portion in which heat exchange between the flow path tube 21 and the fins 22 is suppressed. On the upstream side in the supercharged intake air in which the non-bonded portion 30 is provided, the heat transfer coefficient is lower than that of the downstream side in which the bonded portion 29 is provided, and accordingly the heat exchange between the flow path tube 21 and the fin 22 is limited.

In the example shown in FIG. 4, the non-bonded portion 30 extends from the most upstream portion in the flow direction of the supercharged intake air in the second downstream flow path 26f to a middle part of the second downstream flow path 26f in the widthwise length. Accordingly, both the non-bonded portion 30 and the bonded portion 29 are provided between the fin 22 and a part of the flow path tube 21 corresponding to the second downstream flow path 26f. Between the fin 22 and a part of the flow path tube 21 corresponding to the second upstream flow path 26e, the first downstream flow path 25f, and the first upstream flow path 25e, only the bonded portion 29 is provided. In the example shown in FIG. 4, the non-bonded portion 30 extends entirely in the second downstream flow path 26f in the flow direction of the second cooling water.

According to the above-described first embodiment, in the intercooler 20 which cools the supercharged intake air by using two kinds of the cooling water having different temperature, the non-bonded portion 30, in which the flow path tube 21 defining the cooling water flow path and fin 22 are not bonded, is provided in the most upstream portion in the flow direction of the supercharged intake air. According to this, in the most upstream portion in the flow direction of the supercharged intake air, the heat of the supercharged intake air is prevented from being transmitted to the second cooling water in the second outlet side flow path (second downstream flow path) 26f through the fin 22. As a result, it is possible to suppress boiling of the second cooling water in the second outlet side flow path 26f where the second cooling water easily boils. Accordingly, temperature increase of components around the second outlet side flow path 26f can be suppressed, and reduction in strength and breakage can be avoided.

Further, according to the first embodiment, the non-bonded portion 30 can be provided by simple means such as not cladding the brazing material or not applying the flux to the target portion of the non-bonded portion 30, and accordingly the above-described effect can be obtained with a simple means. Since the fins 22 can be manufactured by roller molding similarly to the conventional one, it is possible to manufacture the intercooler 20 without reducing the productivity.

Second Embodiment

Next, a second embodiment of the present disclosure will be described. In the second embodiment, only parts different from the above-described first embodiment will be described. In the second embodiment, the configuration of the fin 22 is different from that of the first embodiment.

Figure 6:
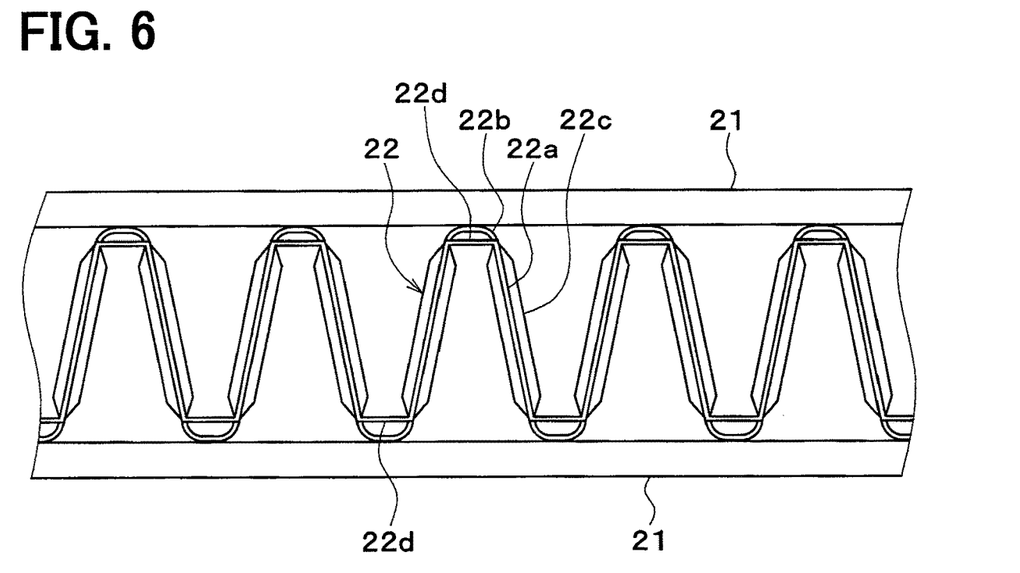
FIG. 6 is a front view illustrating flow path tubes and fins according to a second embodiment of the present disclosure.
Figure 7:
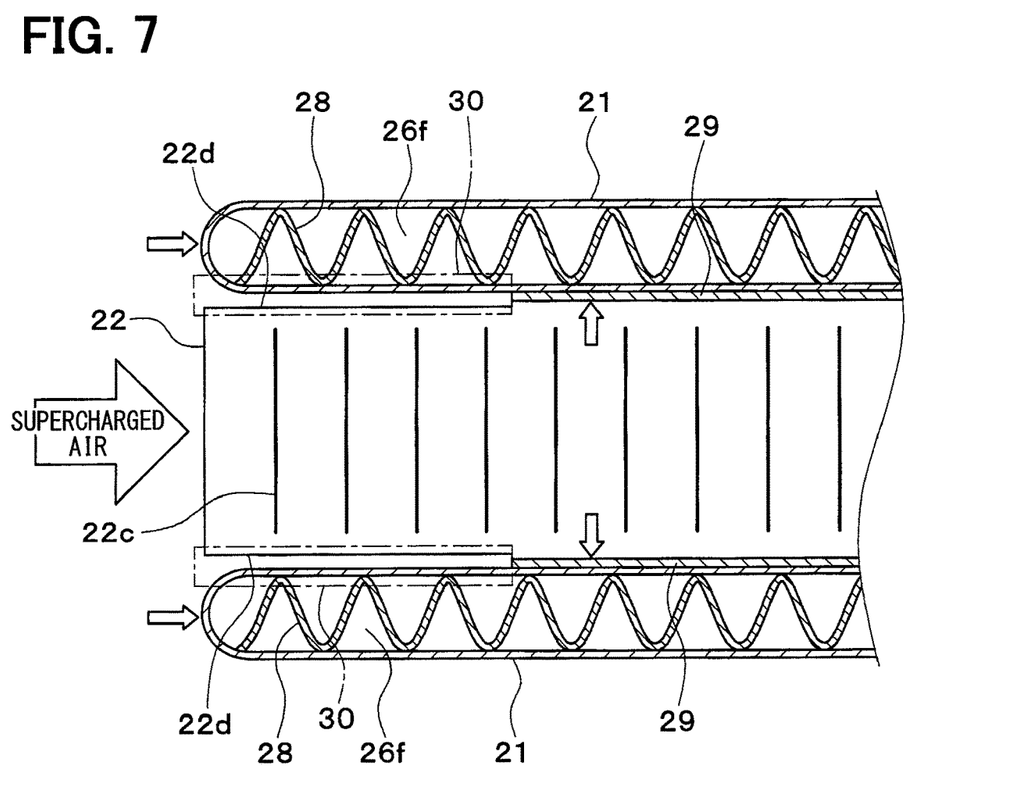
FIG. 7 is a cross-sectional view illustrating flow path tubes and fins according to the second embodiment.

As shown in FIGS. 6 and 7, in the second embodiment, a step portion 22d is provided in the peak portion 22b of the fin 22 at a portion corresponding to the non-bonded portion 30. The height of the step portion 22d is lower than the other portion of the peak portion 22. Therefore, in the non-bonded portion 30, a gap is formed between the flow path tube 21 and the fin 22. The step portion 22d can be provided by means such as pressing a portion corresponding to the non-bonded portion 30 of the peak portion 22b.

According to the second embodiment, since a gap is formed between the flow path tube 21 and the fin 22 in the non-bonded portion 30, the heat of the supercharged intake air can be surely prevented from transmitted to the second cooling water in the second outlet side flow path 26f through the fin 22. Further, according to the second embodiment, the means such as not cladding a brazing material to a target portion, or not applying flux to a target portion of the non-bonded portion 30 is not needed.

The present disclosure is not limited to the above embodiment and can be modified in various manners as described below without departing from the gist of the present disclosure.

In the above-described first embodiment, the non-bonded portion 30 extends from the most upstream portion in the flow direction of the supercharged intake air in the second downstream flow path 26f to middle of the widthwise length of the second downstream flow path 26f. However, the length of the non-bonded portion is not limited to this. Any length of the non-bonded portion 30 is acceptable as long as the non-bonded portion 30 is provided at least in a portion corresponding to the most upstream portion of the second downstream flow path 26f in the flow direction of the supercharged intake air.

That is, the length of the non-bonded portion 30 in the flow direction of the supercharged intake air may be shortened or elongated relative to the configuration shown in FIG. 4. In the case where the length of the non-bonded portion 30 in the flow direction of the supercharged intake air is increased, the non-bonded portion 30 may be extended to a portion near the most downstream portion of the second upstream flow path 26e. That is, it is acceptable as long as the bonded portion 29 is provided at least in a portion corresponding to the most downstream portion of the second upstream flow path 26e in the flow direction of the supercharged intake air. According to this, heat exchange between the fin 22 and the second cooling water flow path 26 of the flow path tube 21 can be secured.

In the above-described first embodiment, the non-bonded portion 30 entirely extends in the second downstream flow path 26f in the flow direction of the second cooling water. However, the non-bonded portion 30 is not limited to this. It is acceptable as long as the non-bonded portion 30 is provided at least in the most downstream portion of the second downstream flow path 26f (that is, a side near the second outlet portion 26b) in the flow direction of the second cooling water.

The step portion 22d of the fin 22 described in the second embodiment may be provided so as to correspond to the non-bonded portion 30. That is, it is acceptable as long as the step portion 22d of the fin 22 is provided at least in a portion corresponding to the most upstream portion of the second downstream flow path 26f in the flow direction of the supercharged intake air. Further, it is acceptable as long as the step portion 22d of the fin 22 is provided at least in the most downstream portion of the second downstream flow path 26f (that is, a side near the second outlet portion 26b) in the flow direction of the second cooling water.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. An intercooler that cools supercharged intake air by exchanging heat between cooling medium and the supercharged intake air supercharged to an engine by a supercharger, the intercooler comprising:
    a heat exchange portion in which flow path tubes and fins are stacked with each other, the heat exchange portion being configured to exchange heat between the cooling medium flowing inside the flow path tubes and the supercharged intake air flowing outside the flow path tubes, wherein
    the cooling medium includes first cooling medium and second cooling medium, a temperature of the second cooling medium being higher than a temperature of the first cooling medium,
    the flow path tubes define therein
        a first cooling medium flow path through which the first cooling medium flows in a direction intersecting a flow direction of the supercharged intake air, and
        a second cooling medium flow path through which the second cooling medium flows in a direction intersecting the flow direction of the supercharged intake air,
    the second cooling medium flow path is located upstream of the first cooling medium flow path with respect to the flow direction of the supercharged intake air,
    the first cooling medium flow path includes a first U-turn portion in which the first cooling medium makes a U-turn,
    the second cooling medium flow path includes
        a second U-turn portion in which the second cooling medium makes a U-turn,
        a downstream flow path located downstream of the second U-turn portion, and
        an upstream flow path located upstream of the second U-turn portion,
    the downstream flow path is located upstream of the upstream flow path with respect to the flow direction of the supercharged intake air, and
    a heat exchange limiting portion, which is configured to limit a heat exchange between the flow path tubes and the fins, is provided at least at a position between the flow path tubes and the fins, the flow path tubes and the fins facing each other at the position, the position being adjacent to a most upstream part, in the flow direction of the supercharged intake air, of the downstream flow path,
    the heat exchange limiting portion is aligned with the most upstream part of the downstream flow path in a direction in which the flow path tubes and the fins are stacked with each other.

2. The intercooler according to claim 1, wherein
    the heat exchange limiting portion is provided at least at a position adjacent to a most downstream part, in the flow direction of the second cooling medium, of the downstream flow path.

3. The intercooler according to claim 1, wherein
    the flow path tubes and the fins are brazed with each other, and
    the heat exchange limiting portion is a non-bonded portion in which the flow path tubes and the fins are not brazed.

4. The intercooler according to claim 1, wherein
    the fins have corrugated shapes bending such that peak portions are alternately located on one side and another side,
    a part of the peak portions corresponding to the heat exchange limiting portion are lower in height than another part of the peak portions, and
    a clearance is provided between the flow path tubes and the peak portions in the heat exchange limiting portion.

5. An intercooler that cools supercharged intake air by exchanging heat between cooling medium and the supercharged intake air supercharged to an engine by a supercharger, the intercooler comprising:
    a heat exchange portion in which flow path tubes and fins are stacked with each other, the heat exchange portion being configured to exchange heat between the cooling medium flowing inside the flow path tubes and the supercharged intake air flowing outside the flow path tubes, wherein
    the cooling medium includes first cooling medium and second cooling medium, a temperature of the second cooling medium being higher than a temperature of the first cooling medium,
    the flow path tubes define therein
        a first cooling medium flow path through which the first cooling medium flows in a direction intersecting a flow direction of the supercharged intake air, and
        a second cooling medium flow path through which the second cooling medium flows in a direction intersecting the flow direction of the supercharged intake air,
    the second cooling medium flow path is located upstream of the first cooling medium flow path with respect to the flow direction of the supercharged intake air,
    the first cooling medium flow path includes a first U-turn portion in which the first cooling medium makes a U-turn,
    the second cooling medium flow path includes
        a second U-turn portion in which the second cooling medium makes a U-turn,
        a downstream flow path located downstream of the second U-turn portion, and
        an upstream flow path located upstream of the second U-turn portion,
    the downstream flow path is located upstream of the upstream flow path with respect to the flow direction of the supercharged intake air,
    a heat exchange limiting portion, which is configured to limit a heat exchange between the flow path tubes and the fins, is provided at least at a position between the flow path tubes and the fins, the position being adjacent to a most upstream part, in the flow direction of the supercharged intake air, of the downstream flow path,
    the heat exchange limiting portion is aligned with the most upstream part of the downstream flow path in a direction in which the flow path tubes and the fins are stacked with each other, the fins have corrugated shapes bending such that peak portions are alternately located on one side and another side, a part of the peak portions corresponding to the heat exchange limiting portion are lower in height than another part of the peak portions, and a clearance is provided between the flow path tubes and the peak portions in the heat exchange limiting portion.

\* \* \* \* \*